B. U. TRAVIS.
Pin and Dowel Machines.

No. 150,989. Patented May 19, 1874.

Witnesses:

Inventor
B. U. Travis
By his Attys
H. D. Wharton

2 Sheets--Sheet 2.

B. U. TRAVIS.
Pin and Dowel Machines.

No. 150,989. Patented May 19, 1874.

Witnesses.  
H. Clay Smith  
C. W. B. Phillips

Inventor  
B. U. Travis  
By his atty  
H. D. Wharton

UNITED STATES PATENT OFFICE.

BURDICK URIAH TRAVIS, OF SUNBURY, PENNSYLVANIA.

IMPROVEMENT IN PIN AND DOWEL MACHINES.

Specification forming part of Letters Patent No. 150,989, dated May 19, 1874; application filed April 27, 1874.

*To all whom it may concern:*

Be it known that I, BURDICK URIAH TRAVIS, of Sunbury, in the county of Northumberland and State of Pennsylvania, have invented certain new and useful Improvements in Pin and Dowel Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of my invention relates to the manufacture of dowels or pins, such as are usually and generally used in the manufacture of doors, sashes, blinds, shutters, frames, and the like, forming them either round or square, cutting them off at the length desired, and rounding or sharpening them at one operation of the machine; and consists in the construction and arrangement of devices, as will be hereinafter described, and then pointed out in the claims.

Figure 1:
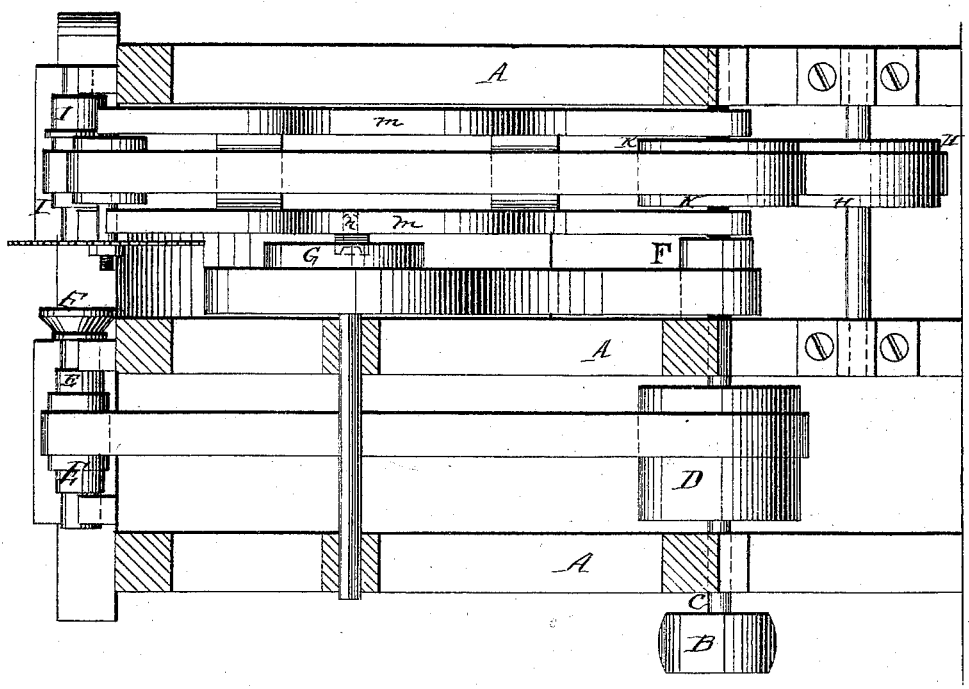
Figure 2:
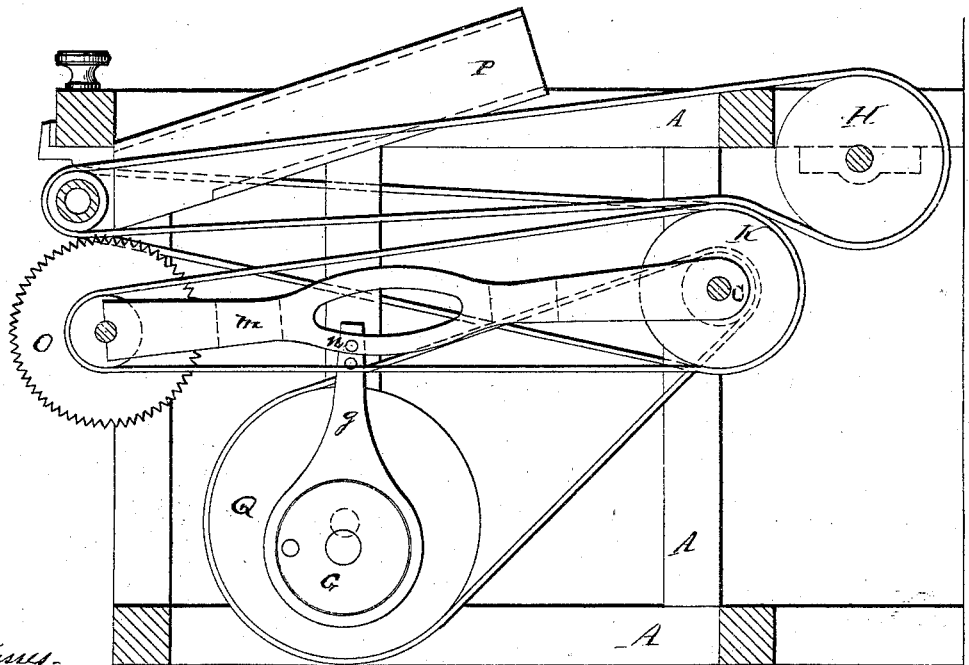
Figure 3:
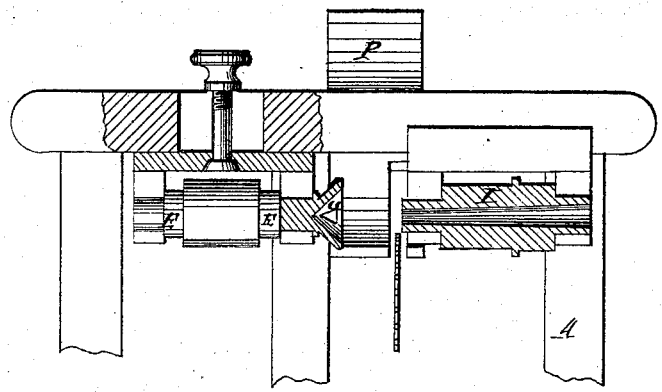
Figure 4:
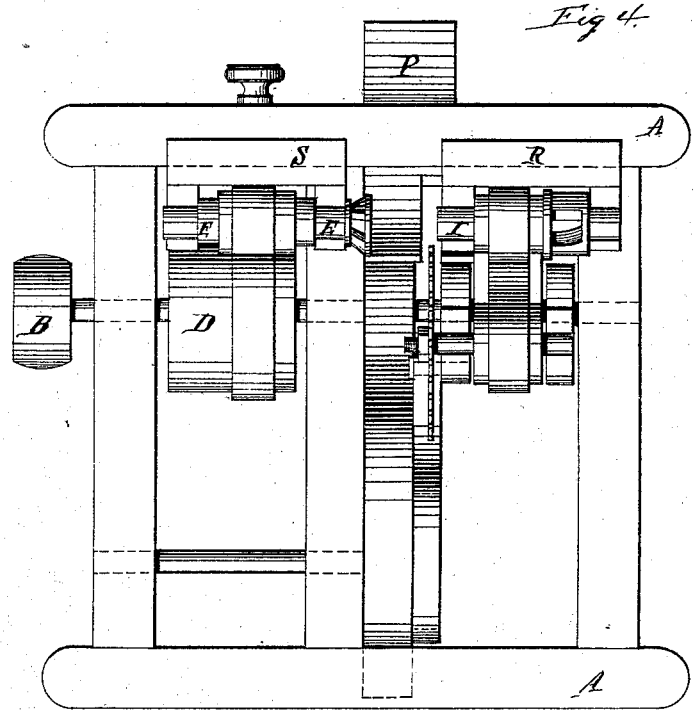

In the accompanying drawings, which form a part of this specification, Figure 1 is a vertical section illustrative of my invention. Fig. 2 is a side elevation, showing the oscillating saw-frame and its governing-eccentric. Fig. 3 is a section showing the adjustable pointing-chuck and the rounding-mandrel, and Fig. 4 is a plan view.

A is the frame, of any desirable form and construction so as to form and furnish journaling for the main shaft C, eccentric-pulley shaft, and mandrel-pulley shaft. B is the driving-pulley, rigidly attached to and carried by the main shaft C, which also carries the eccentric pulley F, chuck-pulley D, and saw-pulley K. C is the main shaft, journaled in any desirable manner in the frame A, which shaft carries the pulleys D, K, and F. D is the chuck-pulley, which governs the shaft of the pointing-chuck E by means of any ordinary known belting. This chuck E is suitably journaled in an adjustable frame, S, to be hereinafter described, and is provided at its inner extremity or mouth, which is conical, with two or more beveled knives, so constructed and arranged as to form a desirable point on the pin or dowel which is to be manufactured. F is the driving-pulley to the eccentric pulley Q, carried by the main shaft C, which pulley Q carries an eccentric, G, which, by crank $g$, governs the saw-frame $m$, and carries the same forward and backward, as is obvious. H is the driving mandrel-pulley, which governs the rounding-mandrel I, which mandrel may be provided with knives, so as to round the article passed through it; or it may be provided with means for clamping the same and submitting it to the action of the chuck and saw. K is the driving saw-pulley, which acts upon and governs the saw-mandrel in the saw-frame $m$. $n$ represents the connection of the saw-frame with the eccentric crank $g$. O is the saw. P is the trough into which the completed pins are cast, whence they are deposited in suitable vehicles for removal. R is the frame of the mandrel, of any desired material or form, the only requisites being to furnish appropriate and durable bearings for the rounding or holding mandrel. S is the adjustable chuck-frame, so constructed and arranged as to be susceptible of adjustment adjacent to or remote from the severing-saw by any suitable known means, either running on bearings of the frame A, or otherwise, the desirable object being to adjust the pointing-chuck E so as to finish the pins of any desired length.

The operation of my machine is evident, in in view of the foregoing description. The pointing-chuck is so provided with knives as to point the timber. The mandrel will, by its knives, make it round, if desired. The adjustability of the chuck allows the operator to govern the length of the completed pin at will. The eccentric carries the saw forward and backward automatically. The power applied to the main shaft, operating upon the chuck by its revolution in one direction, and upon the mandrel by its revolution in an opposite direction, allows of the pointing of the pin. The saw, by its action received from the eccentric, moves forward, severs the pin from the timber, and the completed pin falls in the trough.

I claim—

1. The chuck E, provided with beveled knives for pointing the pins, in combination with its adjustable frame S and set-screw, as specified.

2. The main shaft C and pulleys F, H, K, and D, in combination with chuck E, mandrel I, eccentric G g, and saw O, as shown and specified.

BURDICK URIAH TRAVIS.

Witnesses:
THOS. M. PUESEL,
J. WEISER BUCHER.